United States Patent
Madou et al.

(10) Patent No.: US 10,423,793 B2
(45) Date of Patent: Sep. 24, 2019

(54) INSTALL RUNTIME AGENT FOR SECURITY TEST

(71) Applicant: HEWLETT PACKARD ENTERPRISE DEVELOPMENT LP, Houston, TX (US)

(72) Inventors: Matias Madou, Diegem (BE); Ronald J. Sechman, Alpharetta, GA (US); Sam Ng Ming Sum, Hong Kong (CN)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 181 days.

(21) Appl. No.: 15/317,206

(22) PCT Filed: Jun. 19, 2014

(86) PCT No.: PCT/US2014/043074
§ 371 (c)(1),
(2) Date: Dec. 8, 2016

(87) PCT Pub. No.: WO2015/195125
PCT Pub. Date: Dec. 23, 2015

(65) Prior Publication Data
US 2017/0103211 A1  Apr. 13, 2017

(51) Int. Cl.
*G06F 21/57* (2013.01)
*G06F 11/36* (2006.01)

(52) U.S. Cl.
CPC ........ *G06F 21/577* (2013.01); *G06F 11/3612* (2013.01); *G06F 11/3672* (2013.01); *G06F 2221/033* (2013.01)

(58) Field of Classification Search
CPC ................. G06F 21/577; G06F 1/3611; G06F 2221/033; H04L 29/06904
See application file for complete search history.

(56) References Cited

U.S. PATENT DOCUMENTS

| | | | |
|---|---|---|---|
| 7,076,534 B1 * | 7/2006 | Cleron | G06F 16/9535 709/219 |
| 8,024,450 B1 | 9/2011 | Shiyafetdinov et al. | |
| 8,296,848 B1 * | 10/2012 | Griffin | G06F 21/577 715/201 |

(Continued)

FOREIGN PATENT DOCUMENTS

| | | |
|---|---|---|
| WO | WO-2005/121953 A1 | 12/2005 |
| WO | WO-2014/018042 A1 | 1/2014 |

OTHER PUBLICATIONS

International Search Report and Written Opinion, International Application No. PCT/US2014/043074, dated Feb. 24, 2015, pp. 1-8, KIPO.

(Continued)

*Primary Examiner* — Eleni A Shiferaw
*Assistant Examiner* — Sher A Khan

(57) ABSTRACT

Example embodiments disclosed herein relate to an approach for installing a runtime agent during a security test. A security test is initiated or performed on an application under test executing on a server. An application vulnerability associated with the application under test is determined. The application vulnerability is exploited to install the runtime agent on the server. The security test is continued using the runtime agent to receive additional information about the application under test.

14 Claims, 4 Drawing Sheets

(56) References Cited

U.S. PATENT DOCUMENTS

| | | | |
|---|---|---|---|
| 8,504,994 B2* | 8/2013 | Golender | G06F 9/547 |
| | | | 717/128 |
| 8,613,080 B2 | 12/2013 | Wysopal et al. | |
| 8,683,052 B1 | 3/2014 | Brinskelle | |
| 9,146,721 B1* | 9/2015 | Nagaraja | G06F 8/60 |
| 2002/0087668 A1* | 7/2002 | San Martin | G06F 8/65 |
| | | | 709/221 |
| 2005/0188262 A1* | 8/2005 | Rosenman | G06F 11/2294 |
| | | | 714/25 |
| 2008/0209567 A1* | 8/2008 | Lockhart | G06F 11/3612 |
| | | | 726/25 |
| 2008/0263671 A1* | 10/2008 | Solino Testa | G06F 21/577 |
| | | | 726/25 |
| 2010/0083240 A1* | 4/2010 | Siman | G06F 8/433 |
| | | | 717/144 |
| 2010/0138925 A1 | 6/2010 | Barai et al. | |
| 2012/0017119 A1* | 1/2012 | Ghosh | G06F 11/3684 |
| | | | 714/38.1 |
| 2012/0017200 A1* | 1/2012 | Ghosh | G06F 11/3684 |
| | | | 717/126 |
| 2013/0160131 A1 | 6/2013 | Madou et al. | |
| 2013/0198848 A1* | 8/2013 | Wolff | G06F 21/568 |
| | | | 726/25 |
| 2013/0339930 A1 | 12/2013 | Xu | |
| 2014/0082737 A1* | 3/2014 | Beskrovny | H04L 63/1433 |
| | | | 726/25 |
| 2014/0082739 A1 | 3/2014 | Chess et al. | |
| 2014/0200941 A1* | 7/2014 | McDaniel | G06Q 10/063116 |
| | | | 705/7.16 |
| 2014/0359779 A1* | 12/2014 | Beskrovny | G06F 11/3696 |
| | | | 726/25 |

OTHER PUBLICATIONS

Prithviraj Patil and Sunil Pawar, "Remote Agent Based Automated Framework for Threat Modelling, Vulnerability Testing of SOA Solutions and Web Services," Jun. 2012, pp. 127-131, IEEE.

Yao-Wen Huang et al., "Securing Web Application Code by Static Analysis and Runtime Protection," May 2004, pp. 40-51, ACM.

* cited by examiner

INSTALL RUNTIME AGENT FOR SECURITY TEST

BACKGROUND

Software security testing is used to identify vulnerabilities in an application such as a Web application. Traditional black-box security testing for Web-based software works by using a security testing application, often referred to as a scanner, which poses as an attacker. In a black-box approach, the scanner explores an Application Under Test (AUT) by making Hypertext Transfer Protocol (HTTP) requests and evaluating the HTTP responses in order to find all of the URLs where the AUT accepts input. The URLs where the AUT accepts input may be referred to as the attack surface of the AUT. The scanner then creates attacks based on the attack surface and likely categories of vulnerabilities. The scanner applies the attacks to diagnose the presence or absence of vulnerabilities by evaluating the program's HTTP responses.

BRIEF DESCRIPTION OF THE DRAWINGS

The following detailed description references the drawings, wherein.

DETAILED DESCRIPTION

Figure 1:
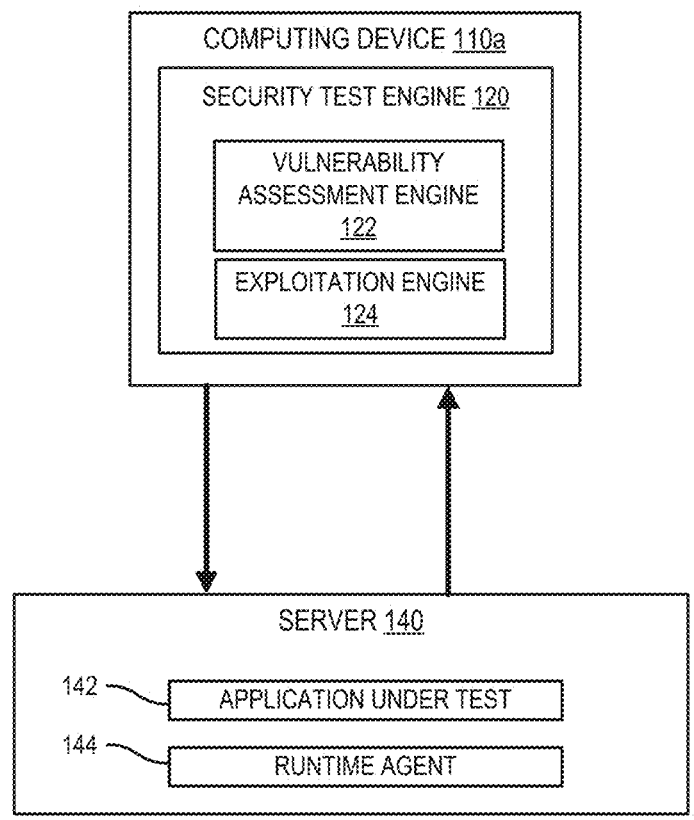
FIGS. 1 and 2 are block diagrams of a computing system and device capable of causing install of a runtime agent on a server during a security test of an application under test, according to various examples.

A web application vulnerability scanner is an approach for identifying vulnerabilities in a web application. A scanner starts by crawling the application under test (AUT) to identify the attack surface. In black-box testing, the tester is unaware of the internal workings of the AUT. In grey-box testing, the tester knows at least a part of the internal workings of the AUT. A runtime agent or observer can be installed on the application server to assist with identifying the attack surface more accurately. As described herein, a software program referred to herein as an observer or runtime agent is used to watch the internal operations performed by the AUT. The runtime agent enables the scanner to determine the operation of the AUT and how it behaves in response to attacks. The runtime agent also enables the scanner to determine the behavior of the AUT in response to normal application requests, which the scanner may use to determine what types of attacks to send. The scanner continues to deliver attacks to the AUT, and the scanner receives knowledge of the internal workings of the AUT from the runtime agent.

In this way, the scanner can find more vulnerabilities and produce better vulnerability reports, thereby providing a more comprehensive and detailed software security test of web-based applications. However, installing a runtime agent onto a server for testing purposes may be challenging. This may be due to procedural reasons at a client for which the web application is being tested. For example, a client wanting a security test (e.g., a penetration test) performed may not think that it is justified to allow a runtime agent to be installed on the application server to aid the tester. However, the client may think that is more fair and justified to allow the security test to install the agent on the application server during the test if it finds a vulnerability. This can be because a hacker may have the ability to add a code to a web application in production to facilitate attacks on the web application.

Accordingly, various embodiments disclosed herein relate to finding a vulnerability during a security test of an application and exploiting that vulnerability to install a runtime agent. Advantages to these approaches include increasing the client's ability to discover vulnerabilities as well as increasing the effectiveness and efficiency of discovering the vulnerabilities by using agent based security testing.

The approach includes performing a security test on the application to discover vulnerabilities. The security test can be dynamic. In one example, the test can include a security penetration test. This can include at least one of black box testing and grey box testing. In certain examples, a dynamic security test includes initiating a test to examine an executing application under test. This can be at least partly from the outside of the application (e.g., attacking the application from another computing device). The test can include crawling a surface of the AUT that is exposed. Areas that may be associated with a vulnerability can then be attacked to verify that a vulnerability exists. In certain examples, the possible vulnerabilities and/or the vulnerabilities that are verified can be analyzed to determine if they can be associated with an approach that can cause the AUT and/or a server executing the AUT to install a runtime agent that can help facilitate additional testing. Examples of vulnerabilities that can be used in such a manner include command injection, SQL injection, combinations of vulnerabilities, etc. In some examples, the process can be prioritized to find vulnerabilities that can be exploited to install a runtime agent earlier.

A runtime agent can be selected that is compatible with the AUT. In certain examples, multiple runtime agents can be configured and stored. The runtime agents can be specific to particular frameworks and/or versions of frameworks/software infrastructures, such as .NET, JAVA, etc. The selection can be based on information asked for and received and/or from analysis of communications with the AUT.

In some examples, once a viable vulnerability is found, the vulnerability can be exploited to cause a script to be downloaded to the server running the AUT. The script can cause download of the selected runtime agent, unpacking of the runtime agent, and install of the runtime agent. In some examples, the AUT can be reset to initiate usage of the runtime agent. Then, the runtime agent can be used to further facilitate the security test.

In certain examples, when a viable vulnerability to install the runtime agent is found, the runtime agent can be installed automatically and/or based on input received from a user. For example, a user interface associated with the security test may ask the user whether to install the runtime agent onto the server via the AUT.

The runtime agent can be implemented as a Runtime Instrumentation Engine. Runtime instrumentation refers to the ability to modify the program code at runtime (or load time) for monitoring, tracing, debugging, or adding extra functionality to the original program code. Various frameworks offer various approaches to enabling this functionality. For example, the Microsoft .NET® framework can use the ICorProfilerCallback and ICorProfilerCallback2 interfaces to help enable such functionality. Other frameworks can include Java,™ WebObjects, web2py, etc. The engine can be in the form of a library or a dynamic-link library (DLL), and can be activated during an early stage of the program initialization to transform any other program code, classes, etc. that are loaded thereafter. A configuration file can instruct the engine as to what should be transformed, intercepted, or monitored.

Figure 2:
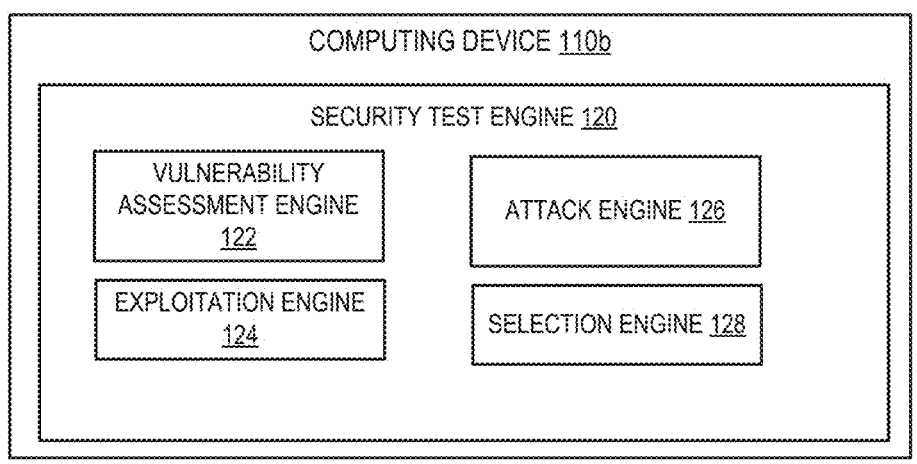

FIGS. 1 and 2 are block diagrams of a computing system and device capable of causing install of a runtime agent on a server during a security test of an application under test, according to various examples. Computing system 100 can include a computing device 110a and a server 140. The computing device 110a can include a security test engine 120 including a vulnerability assessment engine and an exploitation engine 124. Moreover, in some examples, computing device 110b can further include an attack engine 126 and a selection engine 128. The security test engine 120 can be used to test an application under test (AUT) 142 of the server 140. As noted above, a runtime agent 144 can be installed as part of the security test. Devices 110a, 110b include components that can be utilized to test the AUT 142. The respective devices 110a, 110b may be a notebook computer, a desktop computer, a tablet computing device, a wireless device, a server, a workstation, or any other computing device able to perform the functionality described herein.

The engines 120, 122, 124, 126, 128 include hardware and/or combinations of hardware and programming to perform functions provided herein. Moreover, the modules (not shown) can include programing functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine. In some examples, the application under test 142 and/or runtime agent 144 can be implemented as a module and/or an engine.

The security test engine 120 can perform analysis on the AUT 142. The AUT 142 can be an application, such as a web application. In certain examples, the security test engine 120 can include a dynamic module, such as a web application scanner. Further, in some examples, a dynamic analysis tool is an analysis of computer software that is performed while executing some or all of the AUT 142. The analysis may execute to determine vulnerabilities based on one or more rules or configurations.

The security test can include a crawl phase. In the crawl phase, the security test engine 120 crawls the AUT 142, which allows the security test engine 120 to be able to identify an attack surface. This can be done by following links, executing scripts, etc. Further, the security test can determine a framework and/or version of the framework used by the AUT 142. Moreover, programming language and/or version can be taken into account.

Analysis of the crawl can identify one or more potential vulnerabilities based on a configuration and/or rule set (e.g., rules to identify vulnerabilities). The vulnerability assessment engine 122 can categorize these possible vulnerabilities. The categorization can include information as to the type of possible vulnerability associated. The vulnerability assessment engine 122 can also determine whether one or more of the vulnerabilities found can be susceptible to causing download and installation of a runtime agent onto the server 140. This may be due to the type of possible vulnerability. In some examples, the potential vulnerabilities are verified. In other examples, the potential vulnerabilities need not be verified. As such, the vulnerability assessment engine 122 can determine an application vulnerability associated with the AUT 142 during the security test. The application vulnerability can specifically be associated with a type of exploit, such as an injection exploit. In certain examples, an injection exploit that uses some input or data entry feature to introduce data or code into the AUT 142.

Examples of injection exploits include command injection, code injection, SQL injection, other database injection, etc. Further, injection can be used in certain circumstances of Lightweight Directory Access Protocol (LDAP), Xpath, etc. Code injection is the exploitation of a computer bug by processing invalid data. This can be used to introduce or inject code to the AUT 142 to change the course of execution. Command injection can include injection and execution of commands specified. The instructions can be executed as an extension of the AUT 142, providing the same privileges and environment as the AUT 142.

A selection engine 128 can be used to select a runtime agent that is compatible with the AUT 142. This can be based on the framework used in implementing the AUT 142 and/or a version number of the framework. In some examples, a framework is a software providing generic functionality that can be selectively changed by additional user-written code. The framework can be a web application framework designed to support development of web applications, web services, web resources, dynamic websites, etc. In certain examples, multiple runtime agents can be stored at a database. Further, configuration files can be generated for the runtime agents that can specify one or more rules to facilitate security testing. The runtime agents can be specific to particular frameworks and/or versions of frameworks/software infrastructures, such as .NET, JAVA, etc. The selection can be based on information asked for and received and/or from analysis of communications with the AUT 142. For example, one of the runtime agents available at the database can be selected based on framework A being used. Further, the runtime agent can further be selected further based on version X of the framework. Moreover, in some examples, the configuration can be changed based on the framework and/or version.

An exploitation engine 124 can be used to download a script onto the server 140 to cause the server 140 to download and install the selected runtime agent 144. The script can be injected based on the type of vulnerability. Moreover, the download can come from the computing device 110 or another computing device, such as a server accessible via the Internet or other communication network. The script can be executed by the server 140 (e.g., via the AUT 142) to download the selected runtime agent 144. Moreover, the script can cause unpacking of the downloaded file onto the server 140. Further, the script can cause the runtime agent 144 to install and/or begin executing. Beginning execution may include causing the AUT 142 to be reset (e.g., by taking down the AUT 142 and reinitializing, soft booting the AUT 142, etc.).

The security test engine 120 can continue the security test once the runtime agent 144 is executing. The runtime agent 144 can be used to enable the security test engine 120 to receive additional information about the AUT 142. This can include information that can be requested such as trace information from the runtime agent 144. The information can include what is being executed by the AUT 142. This would allow the security test engine 120 to be able to have additional intelligence from the runtime agent 144 while testing the AUT 142.

The security test engine 120 can continue performing the test. This may include crawling the AUT 142 again and/or attacking the AUT 142 via an attack engine 126. In some examples, the security test engine 120 can ask the runtime agent 144 about additional information about the functions being used to generate a list of possible vulnerabilities that the attack engine 126 can create attack vectors for and attack the AUT 142. These vulnerabilities can then be verified and added to a list of vulnerabilities found by the security test engine 120.

A processor, such as a central processing unit (CPU) or a microprocessor suitable for retrieval and execution of instructions and/or electronic circuits can be configured to perform the functionality of any of the modules and/or engines described herein. In certain scenarios, instructions and/or other information, such as runtime agents, rules, configurations, etc., can be included in memory. Input/output interfaces may additionally be provided by a computing device (e.g., a computer or server). Moreover, in certain embodiments, some components can be utilized to implement functionality of other components described herein. Input/output devices such as communication devices like network communication devices or wireless devices can also be considered devices capable of using the input/output interfaces.

Each of the modules or engines may include, for example, hardware devices including electronic circuitry for implementing the functionality described herein. In addition or as an alternative, each module/engine may be implemented as a series of instructions encoded on a machine-readable storage medium of a computing device and executable by a processor. It should be noted that, in some embodiments, some modules are implemented as hardware devices, while other modules are implemented as executable instructions.

A communication network can be used to allow communication between the computing device 110, the server 140, and/or other computing devices (e.g., via the Internet). The communication network can use wired communications, wireless communications, or combinations thereof. Further, the communication network can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network can be in the form of a direct network link between devices. Various communications structures and infrastructure can be utilized to implement the communication network(s).

By way of example, the devices communicate with each other and other components with access to the communication network via a communication protocol or multiple protocols. A protocol can be a set of rules that defines how nodes of the communication network interact with other nodes. Further, communications between network nodes can be implemented by exchanging discrete packets of data or sending messages. Packets can include header information associated with a protocol (e.g., information on the location of the network node(s) to contact) as well as payload information.

Figure 3:
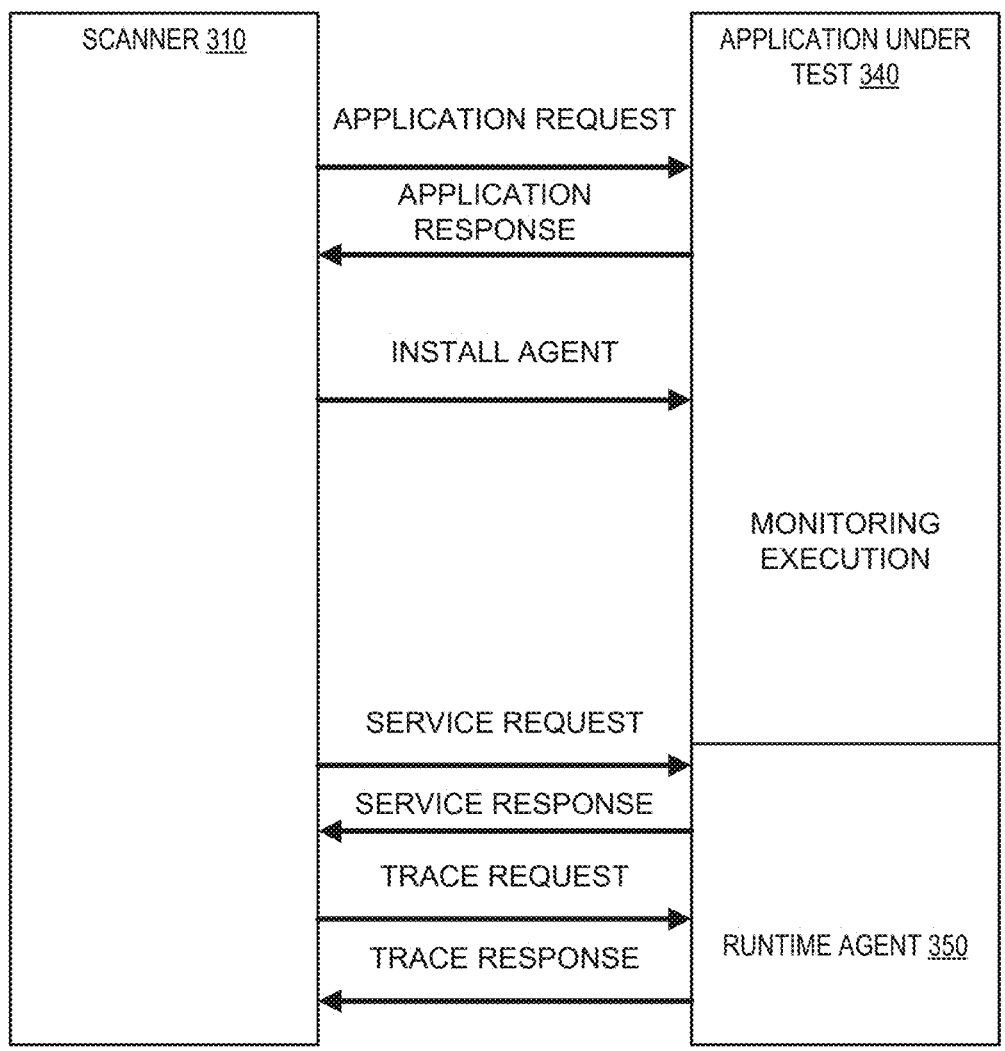
FIG. 3 is a flow system diagram of an approach for installing a runtime agent to help test an application under test, according to one example.

FIG. 3 is a flow system diagram of an approach for installing a runtime agent to help test an application under test, according to one example. The system 300 may include the scanner 310, the AUT 340, and a runtime agent 350 can be installed during a security test performed by the scanner 310.

The AUT 340 may be encoded in any suitable Web-based computer language, such as JAVA, or .NET, among others. The AUT 340 may operate within a suitable software framework, such as Struts, Struts 2, ASP.NET MVC, Oracle WebLogic, and Spring MVC, or the like. The software framework includes a set of common code modules that provide generic functionality, which can be selectively overridden or specialized by user code to providing specific functionality. The AUT 340 may be configured to execute one or more instances of a Java Virtual Machine (JVM), Common Language Runtime (CLR), other runtime environment for processing requests from the scanner 310. The programming instructions provided by the common code modules of the software framework or runtime environment may be referred to as container code. Custom programming instructions specific to the AUT 340 may be referred to as user code.

The AUT 340 can include a network interface for enabling communications between the scanner 310 and the AUT 340 through a network. The network interface exposes the attack surface of the AUT 340 and can be the same interface that would eventually be used to provide access to the AUT 340 when the AUT 340 is made available for general use. Communication between the scanner 310 and the AUT 340 over the network interface may be conducted through HTTP requests issued from the scanner 310 to the AUT 340 and HTTP responses issued from the AUT 340 to the scanner 310. Requests targeting the AUT 340 may be referred to as application requests, and responses received from the AUT 340 may be referred to as application responses. The application requests generated by the scanner 310 may be configured to expose potential vulnerabilities of the AUT 340.

The AUT 340 may be coupled to a file system, a database, and other resources used by the AUT 340. The database may include a variety of user information such as a table of usernames and passwords used to grant access to various resources of the AUT 340, for example. The file system may include data and programs used by the AUT 340, as well data which may be requested by a user such as HTTP pages, software programs, media files, and the like.

When the scanner 310 initiates a security scan on the AUT 340, the scanner 310 can use application requests and responses to crawl the surface of the AUT 340. This can be considered the attack surface. Analysis on the attack surface and application requests/responses can be used to find vulnerabilities. These vulnerabilities can be assessed to determine whether a runtime agent can be installed onto the server hosing the AUT 340 using the vulnerability. The scanner 310 can then cause install of the runtime agent onto the server. As noted above, selection of the agent can be based on the framework used by the AUT 340. The install can be based on a script injected into the AUT 340 to cause the AUT 340 to download the agent. Moreover, the runtime agent 350 can be initialized by rebooting the AUT 340. Application requests and responses can be used in exploiting the AUT 340 to install the agent.

The runtime agent 350 can operate within the execution environment of the AUT 340 and has access to the internal operations performed by the AUT 340. For example, the runtime agent 350, in certain examples, may modify the bytecode of the AUT 340 by injecting additional code, such as a JAVA class, at various program points. The injected code acts as a monitor that observes the AUT 340. The injected monitor code may be located at strategic program points in the AUT 340, for example, application programming interface (API) calls that perform specific operations such as reading a URL parameter or writing to the file system. Whenever such a program point in the AUT 340 is executed, the monitor calls into services provided by the runtime agent 350 to record operations performed by AUT 340. The runtime agent 350 may be coupled to a buffer for storing information that has been collected regarding the internal operations of the AUT 340. The buffer may be used to store data that has been collected but has not yet been reported to the scanner 310. The buffer may be stored in non-volatile storage medium such as a hard disk, solid state drive, and the like.

The runtime agent 350 may also include an additional network interface for enabling communications between the runtime agent 350 and the scanner 310 through the network. Both network interfaces may use the same communication channel, for example, the same HTTP channel. Communications between the scanner 310 and the runtime agent 350 may be implemented through the use of custom request and response headers. Custom headers may be added to the application requests by the scanner 310, and custom headers may be added to the application responses by the runtime agent 350. In this way, at least some of the communications between the scanner 310 and the runtime agent 350 may be piggy-backed on normal communications with the AUT 340.

The scanner 310 may add one or more custom headers to each application request, wherein the custom headers include information that the runtime agent 350 may use to diagnose a vulnerability related to an attack in progress. Information within the custom header can include the version of the scanner 310, or the payload that the scanner 310 is using in the attack. The payload information may be used by the runtime agent 350 to determine whether the attack succeeded.

The scanner 310 may also use custom request headers to generate requests that target the runtime agent 350 to obtain additional information regarding the internal processes performed by the AUT 340, or information about AUT 340, the server, or the runtime agent 350. Requests targeting the runtime agent 350 may be referred to as service requests, and responses received from the runtime agent 350 may be referred to as service responses. Service responses issued by the runtime agent 350 may include supplemental information in the body of the service response, as described further below.

In various examples, the runtime agent 350 is configured to receive the application requests and the service requests sent from the scanner 310 to the AUT 340. The runtime agent 350 may then analyze the header information to determine whether the request is an application request or a service request. Upon receiving an application request, the runtime agent 350 may analyze the header information to acquire data used by the runtime agent 350 regarding the specific application request. Application requests may then be delivered by the runtime agent 350 to AUT 340 for processing by the AUT 340 according to the AUT's programming. When the AUT 340 generates the application response, the runtime agent 350 may add one or more custom headers to the application response to send additional information back to the scanner 310.

In some examples, per-request headers may be custom HTTP headers that include a custom field name followed by one or more field values that are understood by the runtime agent 350 and the scanner 310. In these examples, the custom HTTP headers are ignored by the AUT 340. It will be appreciated that the field names described herein are merely used as examples of field names that could be used in a particular implementation and are not intended to limit the scope of the claims.

Probes/traces can be sent by the scanner 310. For probes sent by the scanner 310, the runtime agent 350 records any vulnerability suggestion based on the behavior of the AUT 340. More particularly, the runtime agent 350 can observe the APIs that are exercised by the probe itself. The runtime agent 350 can be aware of the probe based on a per-request header. For example, the per-request header may include a memo header used to coordinate the interaction between the scanner 310 and the runtime agent 350. In some examples, the scanner 310 may add a memo header probe and/or trace request. The runtime agent 350 may use the memo header identify an attack string associated with the probe.

In response to an application request for a probe/trace, the runtime agent 350 may determine the effect of the application request by determining, for example, particular lines of code that have been executed by the AUT 340, files that have been accessed by the AUT 340, database queries executed by the AUT 340, or other information. The data collected by the runtime agent 350 can be stored to a data structure, referred to herein as a "trace." In embodiments, each trace may be stored in a buffer.

Each trace may include the Request ID of the application request and the application response that corresponds with the trace. The scanner 310 can learn about the internal operations of the AUT 340 that were triggered by a particular application request by retrieving the corresponding trace from the runtime agent 350. To retrieve a trace, the scanner 310 may issue a service request to the runtime agent 350 that includes a header field name/value pair configured to indicate the request of the trace corresponding to a particular application request or response, for example, for particular probes or sets of probes. For example, the field name/value pair for requesting a trace may be formatted as follows:

Trace=<request_id>

The value <request_id> is the value assigned by the scanner 310 or the runtime agent 350 that corresponds with the application request and/or application response associated with the requested trace. Upon receiving the trace service request, the runtime agent 350 may bypass the AUT 340 and generate a service response that includes the requested trace. In certain examples, the requested trace may be retrieved by the runtime agent 350 from the buffer and added to the body of the service response, which may then be sent to the scanner 310. Further, in some examples, the service response header includes the request_id value of the requested trace, and the body of the service response may be formatted as a JSON object.

The runtime agent 350 may maintain a plurality of traces in the buffer so that the scanner 310 can request a trace for an application request that has been made. The buffer may be of any size suitable for a particular implementation. In an example, traces stored to the buffer may be removed from the buffer in a first-in-first-out, first-in-last-out, etc. manner if the buffer becomes full.

The scanner 310 may be configured to send a separate trace service request after the corresponding application request was made and a response received from the AUT 340. The request_id enables the runtime agent 350 to receive trace requests out-of-sequence while still being able to associate the received trace with the appropriate application request and response. Trace requests may be received out-of-sequence due, in part, because the scanner 310 might have multiple threads of execution issuing application requests to the AUT 340.

In some examples, a request ID can be associated with the respective probes. Information collected about the probes can be stored in a database that may be referenced using the request ID. When a trace request arrives for a particular request ID or multiple request IDs, information about the probes (e.g., attack suggestions) can be provided.

The runtime agent 350 may monitor processes performed by the AUT 340 that occur outside the context of an application request, such as processes initiated by the additional monitor code injected by the runtime agent 350. To avoid incurring an unacceptable level of performance overhead, the runtime agent 350 may be configured to minimize the performance overhead of monitoring processes that are unrelated to application requests. For example, the performance overhead may be minimized by injecting the monitor code to selectively monitor specific API calls and relevant portions of the AUT's user code.

Figure 4:
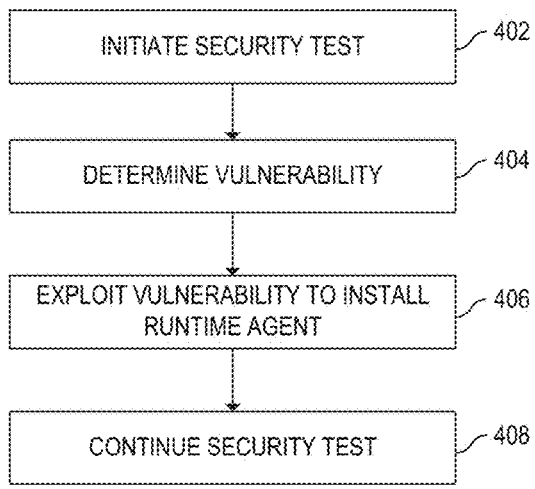
FIG. 4 is a flowchart of a method for installing a runtime agent during a security test to provide information for the security test, according to one example.
Figure 5:
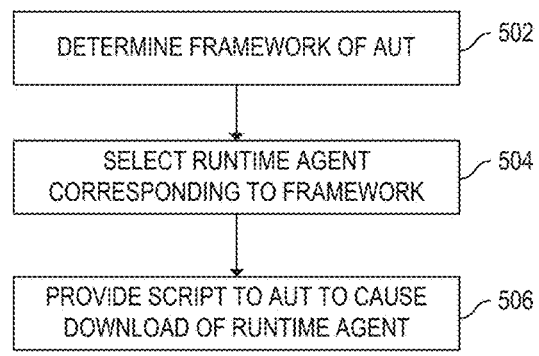
FIG. 5 is a flowchart of a method for selecting a runtime agent to install to facilitate a security test, according to one example.
Figure 6:
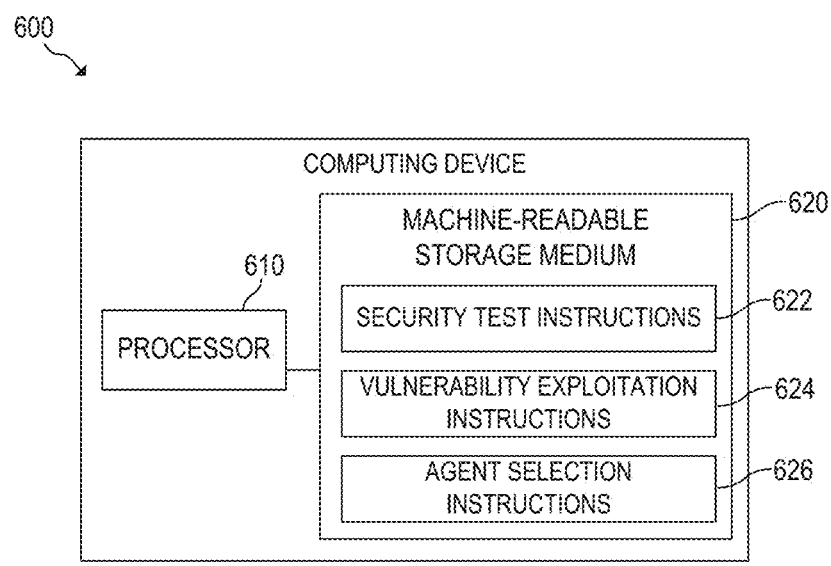
FIG. 6 is a block diagram of a computing device capable of installing a runtime agent to facilitate a security test, according to one example.

FIG. 4 is a flowchart of a method for installing a runtime agent during a security test to provide information for the security test, according to one example. FIG. 5 is a flowchart of a method for selecting a runtime agent to install to facilitate a security test, according to one example. FIG. 6 is a block diagram of a computing device capable of installing a runtime agent to facilitate a security test, according to one example.

Although execution of methods 400 and 500 are described below with reference to computing device 600, other suitable components for execution of methods 400 and 500 can be utilized (e.g., computing system 100 and/or scanner 310). Additionally, the components for executing the methods 400 and 500 may be spread among multiple devices. Methods 400 and 500 may be implemented in the form of executable instructions stored on a machine-readable storage medium, such as storage medium 620, and/or in the form of electronic circuitry.

The computing device 600 includes, for example, a processor 610, and a machine-readable storage medium 620 including instructions 622, 624, 626 for performing a security test on an AUT and installing a runtime agent to facilitate the security test. Computing device 600 may be, for example, a notebook computer, a desktop computer, a workstation, a server, a slate computing device, a portable reading device, a wireless email device, a mobile phone, or any other computing device capable of performing the functionality described herein.

Processor 610 may be, at least one central processing unit (CPU), at least one semiconductor-based microprocessor, at least one graphics processing unit (GPU), other hardware devices suitable for retrieval and execution of instructions stored in machine-readable storage medium 620, or combinations thereof. For example, the processor 610 may include multiple cores on a chip, include multiple cores across multiple chips, multiple cores across multiple devices (e.g., if the computing device 600 includes multiple node devices), or combinations thereof. Processor 610 may fetch, decode, and execute instructions 622, 624, 626 to implement methods 400, 500. As an alternative or in addition to retrieving and executing instructions, processor 610 may include at least one integrated circuit (IC), other control logic, other electronic circuits, or combinations thereof that include a number of electronic components for performing the functionality of instructions 622, 624, 626.

Machine-readable storage medium 620 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 620 may be encoded with a series of executable instructions for installing a runtime agent for use with an AUT during a security test based on a vulnerability found during the test.

Referring to method 400, security test instructions 622 can be executed to perform a security test on an application under test running on a server. At 402, the computing device 600 can initiate the security test. As noted above, the security test can be a dynamic security test. The security test can start with a crawl of the attack surface of the AUT. The security test can determine one or more vulnerabilities or possible vulnerabilities via the crawl (404). In some examples, the vulnerabilities can be confirmed via an audit process. Moreover, the vulnerabilities can be classified and/or attributes can be determined for found vulnerabilities. As such, it can be determined whether one or more of the vulnerabilities found are vulnerable to injection of code onto the server via the AUT. As noted, examples of vulnerabilities vulnerable to injection of code include command injection, code injection, SQL injection, etc.

At 406, the application vulnerability is exploited to cause install of a runtime agent onto the server using vulnerability exploitation instructions 624. As noted, exploiting the application vulnerability can be used to provide (e.g., upload, cause download, etc.) a script via the AUT on the server. The script can cause the server to download and install the runtime agent. The choice of the script to use and/or the runtime agent to use can be determined as further detailed in method 500.

At 408, the security test can be continued. This can be after a reset of the AUT. During the continued security test, the runtime agent can be used to receive additional information about the AUT as further detailed in FIG. 3. As noted, the additional information can include information about what is being executed at the AUT at a given point. As such, the runtime agent can be used to provide additional information about the internal operations of the AUT. For example, the additional information can be used to find more paths that can add depth to a security audit. Moreover, richer information about the vulnerabilities found can be determined. In some examples, the AUT can be crawled again using the runtime agent to find additional attack surface.

Referring to method 500, agent selection instructions 626 can be executed by at least one processor 610 to determine a framework of the AUT at 502. As noted above, the determination can be based on communications with the AUT and/or analysis of the AUT. The framework can include the type of framework (e.g., .NET, Struts, etc.) and/or a version of the framework.

At 504, the computing device can select a runtime agent from a group of runtime agents based on the framework. In one example, a data structure can correlate which runtime agents to use with particular frameworks and/or version numbers. Moreover, the data structure and/or another data structure can be used to correlate between a version number of the framework and a configuration (e.g., set of rules) to use for a selected runtime agent. A script used for installing the runtime agent can also be selected based on the framework and/or version number.

At 506, the script can be provided to the AUT to cause download of the runtime agent. As noted, the script can be caused to be executed by the AUT via the vulnerability. As such, the AUT can download the runtime agent. The script can then cause unpacking of the selected runtime agent for install. In certain examples, once the runtime agent is unpacked, the AUT can be restarted to enable the runtime agent. This can be via a restart of the server, a soft reset of the AUT, etc. The runtime agent can then be used by the security test.

What is claimed is:

1. A non-transitory machine-readable storage medium storing instructions that, if executed by at least one processor of a device, cause the device to:
   initiate a security test on an application under test (AUT) to execute at a server;
   determine an application vulnerability associated with the AUT;
   determine a first framework used at the server and associated with the AUT;
   select a first runtime agent from a group of runtime agents based on determining that the first framework associated with the AUT is used at the server, wherein different runtime agents of the group of runtime agents are associated with respective different frameworks, wherein the selecting of the first runtime agent is based on accessing a data structure that correlates the different runtime agents with the respective different frameworks;
   exploit the application vulnerability to install the first runtime agent on the server, the exploiting comprising providing a script to the AUT via the application vulnerability to cause download of the first runtime agent, and unpacking the first runtime agent for the installation at the server;
   restart the AUT prior to a continuation of the security test and after the installation of the first runtime agent; and
   continue the security test using the first runtime agent to receive additional information about the AUT.

2. The non-transitory machine-readable storage medium of claim 1, wherein the first runtime agent is used to provide the additional information about internal operations performed by the AUT.

3. The non-transitory machine-readable storage medium of claim 1, wherein the determined application vulnerability comprises a vulnerability of the AUT to injection of code onto the server via the AUT.

4. The non-transitory machine-readable storage medium of claim 1, further comprising instructions that if executed cause the device to:
   add a header to an application request sent to the AUT, the header comprising information useable by the first runtime agent to diagnose the application vulnerability.

5. The non-transitory machine-readable storage medium of claim 4, wherein the header further comprise a payload used by the device in an attack of the AUT as part of the security test.

6. The non-transitory machine-readable storage medium of claim 4, further comprising instructions that if executed cause the device to:
   receive information from the first runtime agent responsive to the header, the received information comprising information of portions of code executed by the AUT in response to the application request.

7. The non-transitory machine-readable storage medium of claim 4, further comprising instructions that if executed cause the device to:
   receive information from the first runtime agent responsive to the header, the received information comprising information of an internal operation of the AUT responsive to the application request.

8. A method performed by a system comprising a hardware processor, comprising:
   initiating a security test on an application under test (AUT) executing at a server;
   determining an application vulnerability associated with the AUT during the security test;
   determining a first framework associated with the AUT and used at the server;
   selecting a first runtime agent from a group of runtime agents based on determining that the first framework associated with the AUT is used at the server, wherein different runtime agents of the group of runtime agents are associated with respective different frameworks, wherein the selecting of the first runtime agent is based on accessing a data structure that correlates the different runtime agents with the respective different frameworks;
   exploiting the application vulnerability to provide a script on the server, wherein the script causes the server to download the first runtime agent, unpack the first runtime agent, and install the first runtime agent;
   restarting the AUT prior to a continuation of the security test and after the installation of the first runtime agent; and
   continuing the security test using the first runtime agent executing at the server to receive additional information about the AUT.

9. The method of claim 8, wherein the first runtime agent is used to provide the additional information about what is being executed by the AUT.

10. The method of claim 8, wherein the determined application vulnerability includes command injection.

11. A computing system comprising:
    a processor; and
    a non-transitory storage medium storing instructions executable on the processor to:
    perform a security test on an application under test (AUT) to execute on a server; determine that an application vulnerability associated with the AUT identified by the security test is capable of an injection exploit;
    determine a first framework used at the server and associated with the AUT;
    select a first runtime agent from a group of runtime agents based on determining that the first framework associated with the AUT is used at the server, wherein different runtime agents of the group of runtime agents are associated with respective different frameworks, wherein the selecting of the first runtime agent is based on accessing a data structure that correlates the different runtime agents with the respective different frameworks;
    exploit the application vulnerability to download a script to the server to cause the server to download the first runtime agent, unpack the first runtime agent, and install the first runtime agent;
    restart the AUT prior to a continuation of the security test and after the installation of the first runtime agent; and
    continue the security test using the first runtime agent executing at the server to receive additional information about the AUT including requested trace information about what is executing at the AUT.

12. The computing system of claim 11, wherein the instructions are executable on the processor to:
use the additional information to perform an attack vector on the AUT.

13. The computing system of claim 11, wherein the instructions are executable on the processor to:
add a header to an application request sent to the AUT, the header comprising information useable by the first runtime agent to diagnose the application vulnerability.

14. The computing system of claim 13, wherein the instructions are executable on the processor to:
receive information from the first runtime agent responsive to the header, the received information comprising information of portions of code executed by the AUT in response to the application request.

* * * * *